United States Patent
Canós et al.

(10) Patent No.: US 7,008,611 B2
(45) Date of Patent: Mar. 7, 2006

(54) MICROPOROUS CRYSTALLINE ZEOLITE MATERIAL (ITQ-20) AND PRODUCTION METHOD THEREOF

(75) Inventors: Avelino Corma Canós, Valencia (ES); Urbano Díaz Morales, Valencia (ES); Vicente Fornes Segui, Valencia (ES)

(73) Assignees: Consejo Superior de Investigaciones Cientificas, Madrid (ES); Universidad Politecnica de Valencia, Valencia (ES)

( * ) Notice: Subject to any disclaimer, the term of this patent is extended or adjusted under 35 U.S.C. 154(b) by 175 days.

(21) Appl. No.: 10/630,366

(22) Filed: Jul. 30, 2003

(65) Prior Publication Data

US 2004/0063569 A1    Apr. 1, 2004

Related U.S. Application Data

(63) Continuation of application No. PCT/ES02/00042, filed on Jan. 30, 2002.

(30) Foreign Application Priority Data

Jan. 30, 2001    (ES) ................................ 200100267

(51) Int. Cl.
*C01B 39/48*    (2006.01)
(52) U.S. Cl. ...................... 423/718; 423/706; 423/708; 423/329.1
(58) Field of Classification Search ................ 423/718, 423/329.1, 706, 708
See application file for complete search history.

(56) References Cited

U.S. PATENT DOCUMENTS

| | | | | |
|---|---|---|---|---|
| 4,954,325 A | * | 9/1990 | Rubin et al. | ................. 423/706 |
| 5,278,115 A | * | 1/1994 | Kresge et al. | ................. 502/84 |
| 5,284,643 A | * | 2/1994 | Morrison et al. | ........... 423/705 |

* cited by examiner

*Primary Examiner*—David Sample
(74) *Attorney, Agent, or Firm*—Klauber & Jackson

(57) ABSTRACT

The invention relates to a microporous crystalline zeolite material having the empirical formula $$x(M_{1/n}XO_2):yYO_2:(1-y)SiO_2$$

wherein x has a value less than 0.02; y has a value less than 0.1; M is at least an inorganic cation with a +n charge; X is at least a chemical element having oxidation state +3, preferably selected from the group consisting of Al, Ga, B, Cr, Fe, and Y is at least a chemical element with oxidation state +4, preferably selected from the group consisting of Ge, Ti, Sn, V. The inventive material can be obtained by means of a process comprising: preparing a laminar precursor, crystallized from a reaction mixture; swelling the precursor in a solution in order to obtain a swollen laminar material; which is then washed and dried to obtain a swollen solid; delaminating the solid to obtain a delaminated material in suspension; separating the delaminating material and eliminating the organic remnants by cationic exchange and/or calcination.

22 Claims, 2 Drawing Sheets

MICROPOROUS CRYSTALLINE ZEOLITE MATERIAL (ITQ-20) AND PRODUCTION METHOD THEREOF

RELATED APPLICATIONS

The present application is a Continuation of co-pending PCT Application No. PCT/ES02/00042, filed Jan. 30, 2002 which in turn, claims priority from Spanish Application Serial No. 200100267, filed on Jan. 30, 2001. Applicants claim the benefits of 35 U.S.C. §120 as to the PCT application and priority under 35 U.S.C. §119 as to said Spanish application, and the entire disclosures of both applications are incorporated herein in their entireties.

TECHNICAL FIELD OF THE INVENTION

The present invention belongs to the sector of microporous zeolitic materials, particularly to synthetic delaminated zeolitic materials and more specifically to catalysts corresponding to such materials.

OBJECTS OF THE INVENTION

The first object of the present invention is a microporous crystalline material useful as a catalyst in hydrocarbon cracking reactions, alkane isomerization, dewaxing and isodewaxing of paraffins.

A second object of the invention is a method for the preparation of the microporous zeolitic material and the most suitable conditions for synthesis thereof.

PRIOR ART

Laminar materials such as clays, phosphates and zirconium phosphonates, hydrotalcite type hydroxycarbonates, silicic acids (kanemite, magadite, etc.), transition metal sulfides, graphite, laminar hydroxides and others are capable of swelling in the presence of water and/or suitable interlaminar cations. The individual sheets of these materials are kept together by means of weak bonds of the hydrogen type bond and/or electrostatic interactions. These bonds are easily broken when the intercalation force or the solvatation energy of the cations is greater than the interlaminar attraction forces. This is the case, for example, of sodium montmorillonite that swells up to interlaminar distances greater than 10 nm, in the presence of an excess of water. The interest of the swollen materials is to make the interlaminar space accessible to reactive molecules, and consequently, the inside surface, considerably increasing the accessible active surface of the catalyst. When the material intercalated between the sheets of the mixed oxide is removed by roasting, the swollen laminar compound collapses, recovering the original interlaminar distance.

Several processes have been developed in order to prevent interlaminar collapse. One of them consists of intercalation, by interlaminar exchange or cation solvatation of polar molecules with very long hydrocarbonaceous chains that give rise to very large distances of separation between sheets. Under these conditions, the interlaminar attraction forces are very weak, and a subsequent treatment, for example with ultrasound or stirring may manage to definitively separate the sheets from one another.

DESCRIPTION OF THE INVENTION

The present invention refers to a microporous crystalline material of zeolitic nature with a high external surface and a crystalline structure, capable of support Brönsted and Lewis acids.

This new material is obtained from a laminar precursor that is subsequently transformed by means of a process that involves delamination of the laminar material. The material is useful in reactions such as dewaxing and isodewaxing of paraffins, cracking and alkane isomerization.

The microporous crystalline material of zeolitic nature (also identified as ITQ-20 in the text of the present specification) is characterized in that it has in a state calcinated at temperatures between 300° C. and 800° C. and in an anhydrous state an X-ray diffreactio pattern with basal spacings and intensities summarized in the following table:

TABLE 1

| d (Å) | (I/IO) *100 |
|---|---|
| 32.82 ± 0.02 | vs |
| 11.97 ± 0.03 | w |
| 10.05 ± 0.04 | w |
| 9.39 ± 0.06 | m |
| 7.05 ± 0.05 | w |
| 6.93 ± 0.02 | w |
| 6.56 ± 0.05 | w |
| 5.64 ± 0.07 | w |
| 4.77 ± 0.08 | w |
| 4.27 ± 0.04 | w |
| 3.98 ± 0.08 | w |
| 3.89 ± 0.08 | w |
| 3.72 ± 0.03 | w |
| 3.53 ± 0.05 | w |
| 3.46 ± 0.07 | w |
| 3.34 ± 0.06 | w |
| 2.90 ± 0.08 | w | wherein
w is a weak relative intensity between 0 and 20%;
m is an average relative intensity between 20 & 40%;
s is an average relative intensity between 40 and 60%;
vs is an average relative intensity between 60 and 100%.

On the other hand, the material is also characterized in that it has the empirical formula

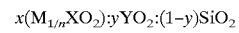

$x(M_{1/n}XO_2):yYO_2:(1-y)SiO_2$ wherein
x has a value less than 0.2, preferably less than 0.1, and more preferably less than 0.02, and it may have the value 0;
y has a value less than 0.1, preferably less than 0.05, and more preferably less than 0.02;
M is at least one +n charge inorganic cation, that may be an alkaline metal or alkaline earth metals, such as for example Na, K, Li, or hydrogen;
X is at least one chemical element with a +3 oxidation state, preferably selected from the group consisting of Al, Ga, B, Cr and Fe;
Y is at least one chemical element with a +4 oxidation state, preferably selected from the group consisting of Ge, Ti, Sn and V.

The material ITQ-20 preferably has specific surface characteristics, measured by $N_2$ adsorption-desorption, of an external surface of at least 100 $m^2g^{-1}$, and preferably with more than 400 $m^2g^{-1}$. It is thermally stable up to temperatures of some 800° C.

Resulting values obtained when the BET equation is applied to the nitrogen adsorption isotherm values, to the temperature of liquid nitrogen, to a series of samples whose X-ray diffractograms have basal spacing values and relative intensities corresponding to table 1 above, are summarized on the following table:

TABLE 2

| Sample | $S_{BET}$ (m²g⁻¹) | $S_{MIC}$ (m²g⁻¹) | $S_{EXT}$ (m²g⁻¹) | $V_{TOT}$ (cm³g⁻¹) | $V_{MIC}$ (cm³g⁻¹) | $V_{BJH}$ (cm³g⁻¹) |
|---|---|---|---|---|---|---|
| ITQ-20 | 571 | 123 | 448 | 0.0470 | 0.0562 | 0.2012 |

In accordance with the invention, the material ITQ-20 can be synthesized by means of a process that comprises the steps specified hereinafter.

A precursor is prepared in a first step by subjecting to heating, with or without stirring, at a temperature between 100 and 225° C., preferably between 125 and 200° C., a reaction mixture that contains water and a $SiO_2$ source, that preferably has, in order to enhance the formation of the final material ITQ-19 without the presence of liquid phases considered as impurities, at least 30% of solid silica, such as for example AEROSIL, LUDOX, ULTRASIL, HISIL or tetraethylorthosilicate (TEOS), optionally a source of at least another tetravalent element Y preferably selected from the group consisting of Ge, Ti, V and Sn, optionally a source of at least another trivalent element X preferably selected from selected from the group consisting of Al, B, Ga, Fe and Cr, an organic cation 1-methyl-1,4-diazabicyclo[2,2,2]octane as a structure directing agent, and optionally an inorganic cation, preferably a source of alkaline metal such as for example an oxide, hydroxide or salt of lithium, sodium or potassium, until crystallization of the reaction mixture is achieved.

The reaction mixture has a composition, in terms of molar ratios of oxides, comprised between the ranges:

$ROH/SiO_2$=0.01–1.0, preferably 0.1–1.0,
$M_{1/n}OH/SiO_2$=0–1.0, preferably 0–0.2,
$X_2O_3/SiO2$=0–0.1, preferably 0–05, and more preferably 0–0.01,
$YO_2/(YO_2+SiO_2)$ less than 1, preferably less than 0.1,
$H_2O/SiO_2$=0–100, preferably 1–50, wherein M is at least a +n charge inorganic cation, that may be an alkaline metal or alkaline earth metal, such as for example Na, K, Li;

X is at least a trivalent element preferably selected from the group consisting of Al, B, Ga, Fe and Cr;

Y is at least a trivalent element preferably selected from the group consisting of Ge, Ti, Sn and V;

R is an organic cation, preferably 1-methyl-1,4-diazabicyclo[2,2,2]octane (DABCO), which may be added in hydroxide form and another salt to the reaction mixture.

The definition of the reaction mixture based on its empirical formula is the following:

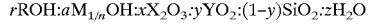

wherein M, X and Y have the above-cited meanings and wherein r=0.01–1.0, preferably 0.1–1.0
a=0–1.0, preferably 0–0.2
x=0–0.1, preferably 0–0.5, and more preferably 0–0.01
y is less than 1, preferably less than 0.1
z=0–100, preferably 1–50.

In one embodiment, the reaction mixture is, in terms of moles of oxide per mole of silica, the following:

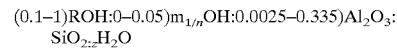

wherein

M has the above-cited meaning,

R is an organic cation that acts as a structure directing agent, and z is a value of 0 to 100, preferably 1–50.

Adding the trivalent element or trivalent elements and/or tetravalent elements can be done prior to the heating of the reaction mixture or in a intermediate phase during heating.

Optionally, an amount of crystalline material, preferably with the characteristics of the material ITQ-19, as crystallization promoter, can be added to the reaction mixture. The amount of this promoter material is comprised between 0.01 to 15%, preferably 0.05 to 5% by weight referred to the total amount of silica added.

The first step normally has a duration of between 1 and 30 days, preferably 2 to 15 days and it normally proves to be a white solid.

Typically, the precursor has an X-ray diffraction pattern with basal spacings and relative intensities corresponding to those indicated on the following table:

TABLE 3

| d (Å) | (I/IO) *100 | d (Å) | (I/IO) *100 |
|---|---|---|---|
| 11.22 ± 0.02 | vs | 3.60 ± 0.08 | s |
| 10.10 ± 0.03 | w | 3.52 ± 0.05 | vs |
| 8.81 ± 0.05 | w | 3.42 ± 0.06 | s |
| 7.05 ± 0.01 | w | 3.36 ± 0.04 | s |
| 6.30 ± 0.01 | m | 3.32 ± 0.05 | w |
| 5.60 ± 0.02 | w | 3.30 ± 0.01 | w |
| 5.28 ± 0.05 | s | 3.14 ± 0.07 | w |
| 4.98 ± 0.06 | s | 3.10 ± 0.02 | w |
| 4.72 ± 0.01 | w | 3.09 ± 0.03 | w |
| 4.38 ± 0.02 | s | 3.01 ± 0.01 | w |
| 4.21 ± 0.02 | s | 2.81 ± 0.04 | w |
| 3.90 ± 0.03 | w | 2.61 ± 0.04 | w |
| 3.83 ± 0.08 | m | 3.51 ± 0.05 | w |
| 3.73 ± 0.07 | m | 2.48 ± 0.09 | w | wherein w is a weak relative intensity between 0 and 20%;
m is an average relative intensity between 20 & 40%;
s is an average relative intensity between 40 and 60%;
vs is an average relative intensity between 60 and 100%.

In a second stage of the process, the precursor is subjected to swelling in a swelling solution in order to obtain a swollen laminar material. The swelling solution contains organic molecules that are intercalated in order to produce separation of sheets of the precursor. Such organic molecules preferably have a proton acceptor group and a hydrocarbonaceous chain and they may be selected among alkylammonium molecules with a number of carbons between 4 and 24, preferably between 16 and 19. A suitable organic molecule is cetyltrimetylammonium chloride (CTMA⁺).

Swelling is produced in view of the fact that the precursor is exchanged and/or intercalated with the organic compound that keep the laminae of the swollen laminated material very separate in such a way that the attraction forces that keep said sheets separate are substantially reduced, although said forces should not be reduced so that in this second stage delamination is produced.

In accordance with the invention, in a first embodiment of the swelling solution, the same comprises:

a suspension of the solid suspended precursor between 10 up to 50% by weight;

a cetyltrimethylammonium hydroxide solution (OH$^-$, Br$^-$) between 10 up to 50% by weight;

a tetrapropylammonium solution (TPA$^+$) (OH$^-$, Br$^-$) between 20 up to 60% by weight.

As an example of the swelling solution according to this first embodiment, this may comprise:

a suspension of the solid precursor up to 20% by weight;

a cetyltrimetylammonium hydroxide solution (OH$^-$, Br$^-$) up to 29% by weight;

a tetrapropylammonium solution (OH$^-$, Br$^-$) up to 40% by weight;

with a weight ratio of precursor suspension:cetyltrimethylammonium hydroxide (OH$^-$, Br$^-$) solution:tetrapropylammonium (OH—, Br$^-$) solution of 27:105:33.

In a third stage of the process according to the invention, the swollen laminar material is washed and dried in order to obtain a dry swollen solid. Preferably, the washing is thoroughly carried out in water and the drying is preferably carried out temperatures lower than 300° C., more preferably at lower temperatures.

The dry swollen solid has a characteristic X-ray diffractogram taking into account the organic compound intercalated between the sheets. Typically, said diffractogram shows the basal spacings and relative intensities corresponding to those shown in the following table:

TABLE 4

| d (Å) | (I/IO) *100 | d (Å) | (I/IO) *100 |
|---|---|---|---|
| 37.89 ± 0.02 | vs | 4.71 ± 0.03 | w |
| 14.50 ± 0.02 | s | 4.23 ± 0.04 | m |
| 12.50 ± 0.03 | m | 4.14 ± 0.08 | m |
| 11.73 ± 0.01 | w | 3.95 ± 0.09 | m |
| 10.01 ± 0.04 | w | 3.86 ± 0.08 | m |
| 7.66 ± 0.05 | w | 3.82 ± 0.09 | m |
| 7.36 ± 0.03 | w | 3.51 ± 0.08 | m |
| 6.99 ± 0.06 | w | 3.43 ± 0.08 | w |
| 6.55 ± 0.05 | w | 3.31 ± 0.05 | w |
| 5.98 ± 0.01 | w | 3.18 ± 0.07 | w |
| 5.59 ± 0.08 | w | 2.88 ± 0.09 | w |
| 5.11 ± 0.04 | w | | | w is a weak relative intensity between 0 and 20%;
m is an average relative intensity between 20 & 40%;
s is an average relative intensity between 40 and 60%;
vs is an average relative intensity between 60 and 100%.

In a fourth stage of the process according to the invention, the dry swollen solid is subjected to at least partial delamination in water in order to obtain a suspension that contains at least a partially delaminated material.

This fourth stage can be carried out, for example, by first preparing an aqueous suspension of the dry swollen solid, with a water/dry swollen solid ratio by weight of preferably between 4 and 200 and more specifically 10 and 100. Afterwards, the suspension is subjected to controlled stirring, by means of at least a technique selected from among mechanical stirring, ultrasound, spray drying, lyophilization and combinations thereof.

Normally, stirring is carried out by a ultrasound or mechanical technique during 5 seconds and 20 hours, preferably between 5 minutes and 10 hours. The stirred suspension, that is later filtered and washed normally has the appearance of a gel due to the presence of small zeolite particles produced during delamination.

In a fifth stage the at least partially delaminated material is separated from the suspension by means of already known techniques, such as for example filtration and/or centrifugation. In this stage, this can be included in the suspension that contains the at least partially delaminated material which is subjected to flocculation in order to improve the filtration and/or centrifugation characteristics. For this purpose, flocculating materials such as HAc, HCl or HNO$_3$ may be added.

In a sixth final stage, organic wastes are removed from the at least partially delaminated material by means of treatment selected from among cationic exchange, calcination, or combinations thereof. Calcination can be done in an air flow, at a temperature between 300° C. and 800° C., preferably between 400° C. and 600° C., for at least 3 hours. The resulting material has an X-ray diffractogram corresponding to the values indicated in table 1.

BRIEF DESCRIPTION OF THE DRAWINGS

As an integral part of the present specification, some drawings are attached hereto, wherein.

EMBODIMENTS OF THE INVENTION

Some examples of the embodiment of the invention will be described hereinafter.

EXAMPLES

Example 1

A purely siliceous laminar precursor PREITQ-19 is described in this first example. The synthesis gel was prepared using: lithium hydroxide (Fisher), monomethylated 1-methyl-1,4-diazabicyclo[2,2,2]octane hydroxide (DABCO) and an aqueous silica solution (30% by weight) (HS-30 Dupont, Aldrich.).

0.175 g. LiOH.H$_2$O, 108.18 g. DABCO-Me-OH (0.5 M) and 16.667 g. SiO$_2$ (30% by weight) are mixed and stirred vigorously in a thermostatic bath at 50° C. until the 52.151 g. of water present in the mixture evaporate. Hence, we obtain a synthesis gel with the following molar composition:

0.05 LiOH:0.65 R—=H:1 SiO$_2$:40 H$_2$O (Methylated R=DABCO).

Afterwards, the gel is introduced in autoclaves and left for 7 days at 175° C. with a stirring speed of 60 rpm.

Figure 1:
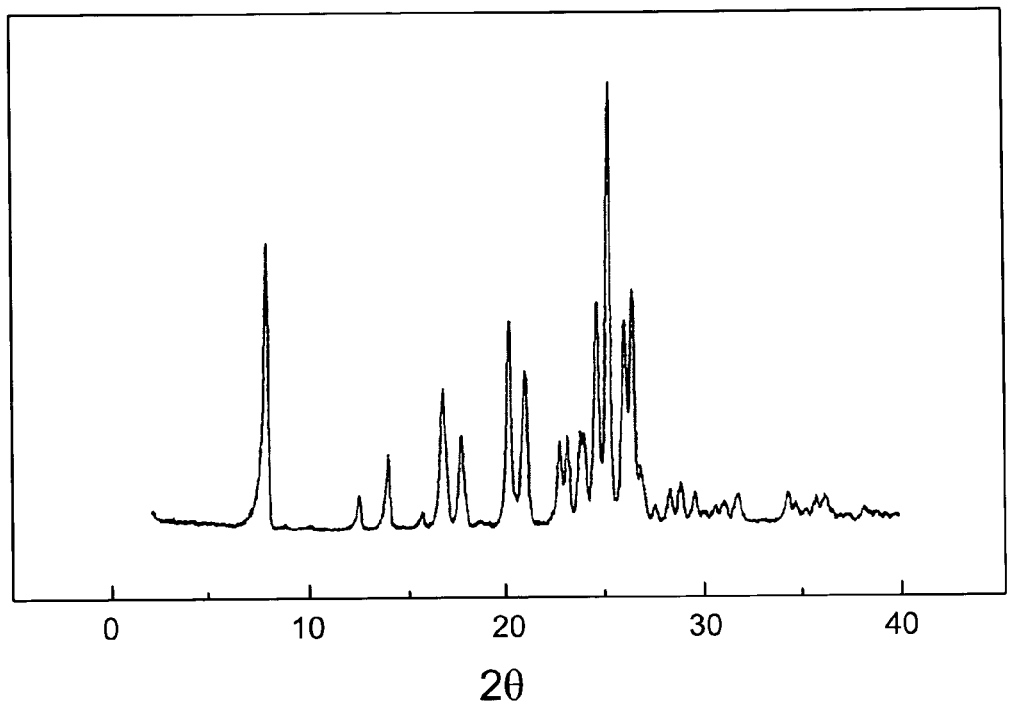
FIG. 1 is a diffractogram of a typical precursor PREITQ-19 resulting from the first stage of the process for preparation of the material ITQ-20.

After this treatment, the samples are filtered and washed with distilled water until the pH of the washing water is <9. Drying is done afterwards in order to obtain the laminar precursor PREITQ-19, whose X-ray diffractogram coincides with the one of FIG. 1.

The material obtained was exchanged with cetyltrimetylammonium (CTMA) according to the following process: 3 g. of a sample PREITQ-19 were suspended in a solution that contained 12 g. of milli-Q water, 60 g. of CTMA$^+$ (OH$^-$Br$^-$) (29% by weight) and 18 g. of TPA$^+$ (OH$^-$Br$^-$).

Figure 2:
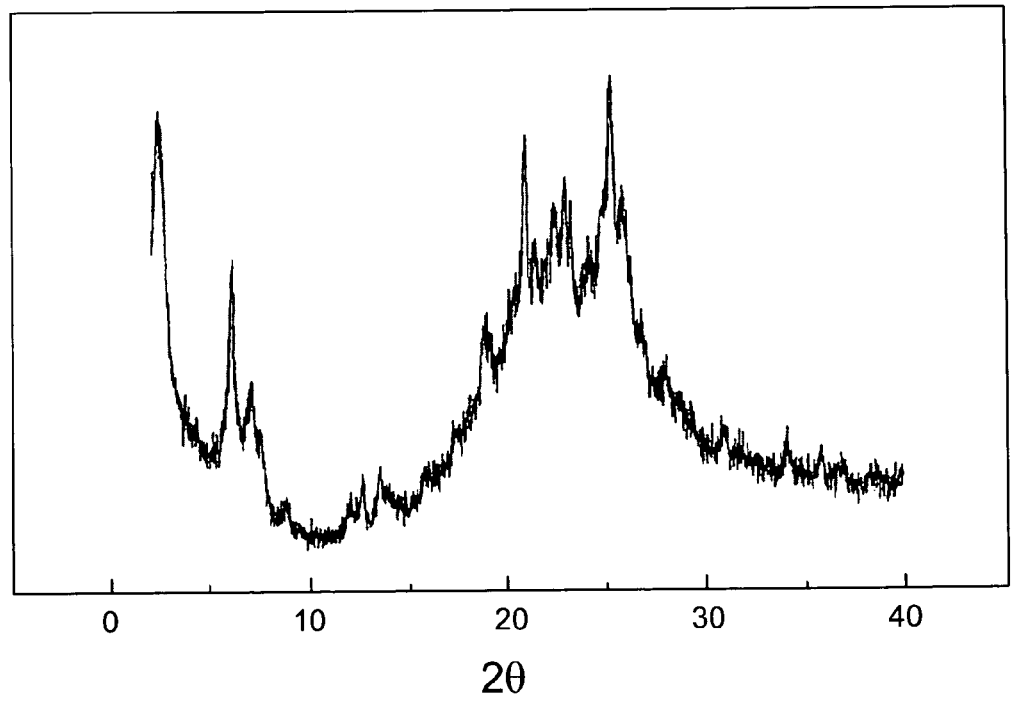
FIG. 2 is a diffractogram of a typical sample of a typical swollen laminar material resulting from the third stage of the process for preparation of the material ITQ-20.
Figure 3:
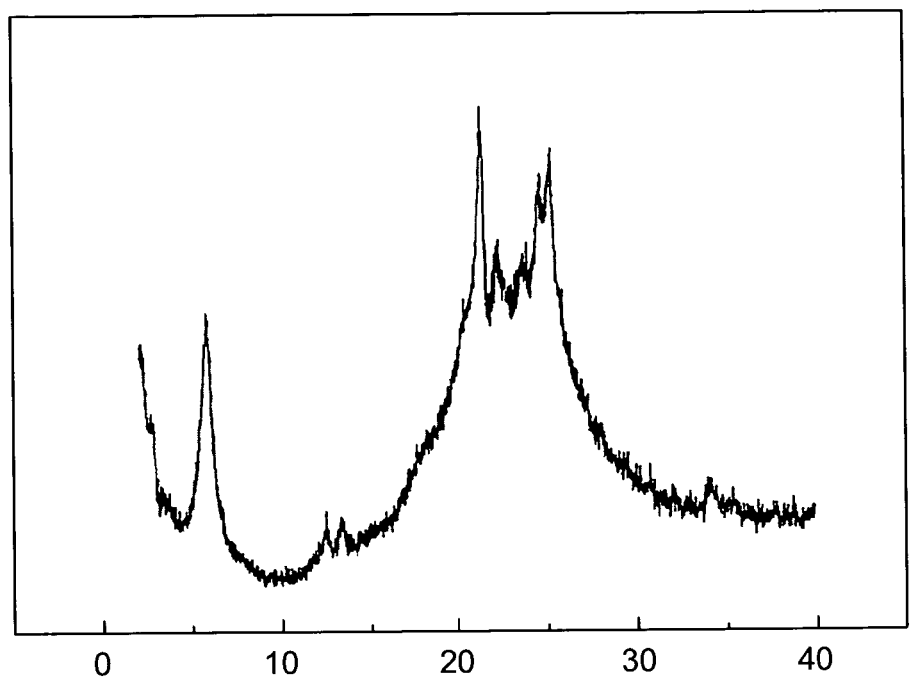
FIG. 3 is a diffractogram of a typical sample of a typical delaminated material resulting from the fifth stage of the process for preparation of the material ITQ-20.

The suspension was kept at reflux for 16 hours at 80° C. and then was thoroughly washed with water and the liquids were separated from the solids. The swollen laminar precursor obtained has a diffractogram that coincides with FIG. 2, whose spacing values $d_{hkl}$ and relative intensities are those given in Table 4.

600 ml of water distilled under constant stirring were added to the material obtained. Then, the suspension was treated with ultrasound at a frequency of 50 Hz and a power of 50 watts for 1 hour, after which the gelled suspension was centrifuged and dried at 100° C. The dry sample was calcinated at 540° C. for 7 hours giving rise to the microporous material ITQ-20 of the type claimed in this patent with an X-ray diffractogram coincide with the one of FIG. 4 and with some spacings $d_{hkl}$ like those of Table 1.

Example 2

The process used in example 1 was repeated with the exception that the suspension obtained after treatment with ultrasound was acidified with 6N HCl in order to facilitate flocculation of the suspended solid, before separation of the liquid phase from the solid phase.

Figure 4:
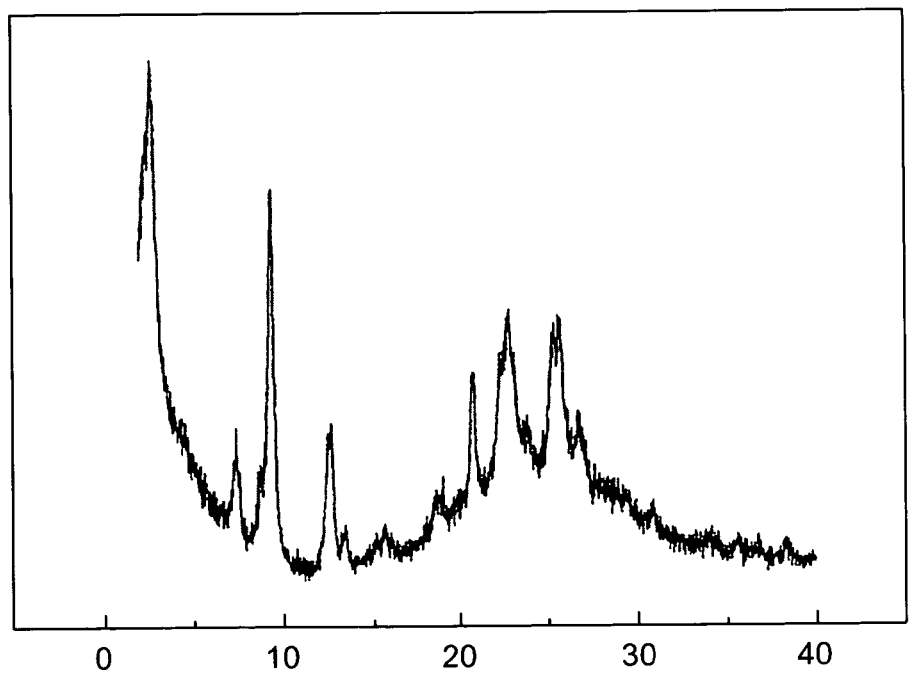
FIG. 4 is a diffractogram of a typical sample of a typical material ITQ-20.

Once the solid obtained has been calcinated, it has a diffraction diagram like the one of FIG. 4 with relative intensities corresponding to those of Table 1.

Example 3

The same process of Example 1 is described but with a final treatment, prior to calcination, of lyophilization of the resulting gel and subsequent roasting.

Example 4

This example describes the process used in Example 1, substituting the ultrasound process by a constant stirring system, using a Cowles type stirrer for 1 hour and at 1,840 rpm. The suspension obtained was acidified with 6N HCl (pH=2), washed with distilled water and centrifuged several times until a final pH higher than 6 has been obtained. Once dried and calcinated at 540° C., the laminar oxide obtained had a diffraction diagram that basically coincides with the one of FIG. 4.

What is claimed is:

1. A microporous crystalline material of zeolitic nature, wherein the material has, in a anhydrous state calcinated at temperatures between 300° C. and 800° C., an X-ray diffraction pattern according to

| d (Å) | (I/IO) *100 |
|---|---|
| 32.82 ± 0.02 | vs |
| 11.97 ± 0.03 | w |
| 10.05 ± 0.04 | w |
| 9.39 ± 0.06 | m |
| 7.05 ± 0.05 | w |
| 6.93 ± 0.02 | w |
| 6.56 ± 0.05 | w |
| 5.64 ± 0.07 | w |
| 4.77 ± 0.08 | w |
| 4.27 ± 0.04 | w |
| 3.98 ± 0.08 | w |
| 3.89 ± 0.08 | w |
| 3.72 ± 0.03 | w |
| 3.53 ± 0.05 | w |
| 3.46 ± 0.07 | w |
| 3.34 ± 0.06 | w |
| 2.90 ± 0.08 | w | wherein
w is a weak relative intensity between 0 and 20%;
m is an average relative intensity between 20 & 40%;
s is an average relative intensity between 40 and 60%;
vs is an average relative intensity between 60 and 100%
and in that it has an empirical formula

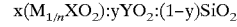
$x(M_{1/n}XO_2):yYO_2:(1-y)SiO_2$ wherein
x has a value less than 0.2;
y has a value less than 0.1:
M is at least one +n charge inorganic cation,
X is at least one chemical element with a +3 oxidation state
Y is at least one chemical element with a +4 oxidation state.

2. A crystalline material according to claim 1, wherein
x has a value less than 0.1
y has a value less than 0.05.

3. A crystalline material according to claim 1, wherein x has the value of 0.

4. A crystalline material according to any one of claims 1 and 2, wherein M is H.

5. A crystalline material according to any one of claims 1,2, and 3 having specific surface characteristics measured by $N_2$ adsorption-desorption, with an external surface of at least 100 $m^2g^{-1}$.

6. A crystalline material according to claim 1, wherein X is at least one chemical element with a +3 oxidation state selected from the group consisting of Al, Ga, B, Cr and Fe.

7. A crystalline material according to claim 1, wherein Y is at least one chemical element with a +4 oxidation state selected from the group consisting of Ge, Ti, Sn and V.

8. A process of synthesizing the crystalline material of any one of claim 1,2, and 3, comprising
a first step wherein a precursor is prepared by subjecting to heating, with or without stirring, at a temperature between 100 and 225° C., a reaction mixture that contains
a $SiO_2$ source,
optionally a $GeO_2$ source,
optionally a source of at least another tetravalent element Y, optionally a source of at least another trivalent element X,
an organic cation 1-methyl-1,4-diazabicyclo[2,2,2]octane,
and water,
wherein the reaction mixture has a composition, in terms of molar ratios of oxides, comprised in the ranges of
ROH/$SiO_2$=0.01,
$M_{1/n}$OH/$SiO_2$=0–1.0,
$X_2O_3$/SiO2=0–0.1,
$YO_2$/($YO_2$+$SiO_2$) less than 1,
wherein
M is at least a +n charge inorganic cation;
X is at least a trivalent element;
Y is at least a trivalent element;
R is the organic cation,
until crystallization of the reaction mixture is achieved;
a second stage wherein the precursor is subjected to swelling in a swelling solution in order to obtain a swollen laminar material;
a third stage wherein the swollen laminar material is washed and dried in order to obtain a dry swollen solid;

a fourth stage wherein the dry swollen solid is subjected to at least partial delamination in water in order to obtain a suspension that contains a material at least partially delaminated;

a fifth stage wherein the material at least partially delaminated is separated from the suspension;

a sixth stage wherein the organic wastes are removed from the at least partially delaminated material, by means of a treatment selected from the group consisting of cationic exchange, calcination and combinations thereof.

9. A process according to claim 8, wherein the organic cation 1-methyl-1,4-diazabicyclo[2,2,2]octane is added in the form of a hydroxide and another salt, to the reaction mixture.

10. A process according to claim 8, wherein an amount of crystalline material, as a crystallization promoter is added to the reaction mixture, said amount being between 0.01 to 15%, by weight referred to the total silica added.

11. A process according to claim 8, wherein the precursor has an X-ray diffractogram that comprises values corresponding to

| d (Å) | (I/IO) *100 | d (Å) | (I/IO) *100 |
|---|---|---|---|
| 11.22 ± 0.02 | vs | 3.60 ± 0.08 | s |
| 10.10 ± 0.03 | w | 3.52 ± 0.05 | vs |
| 8.81 ± 0.05 | w | 3.42 ± 0.06 | s |
| 7.05 ± 0.01 | w | 3.36 ± 0.04 | s |
| 6.30 ± 0.01 | m | 3.32 ± 0.05 | w |
| 5.60 ± 0.02 | w | 3.30 ± 0.01 | w |
| 5.28 ± 0.05 | s | 3.14 ± 0.07 | w |
| 4.98 ± 0.06 | s | 3.10 ± 0.02 | w |
| 4.72 ± 0.01 | w | 3.09 ± 0.03 | w |
| 4.38 ± 0.02 | s | 3.01 ± 0.01 | w |
| 4.21 ± 0.02 | s | 2.81 ± 0.04 | w |
| 3.90 ± 0.03 | w | 2.61 ± 0.04 | w |
| 3.83 ± 0.08 | m | 3.51 ± 0.05 | w |
| 3.73 ± 0.07 | m | 2.48 ± 0.09 | w | wherein w is a weak relative intensity between 0 and 20%;

m is an average relative intensity between 20 & 40%;

s is an average relative intensity between 40 and 60%;

vs is an average relative intensity between 60 and 100%.

12. A process according to claim 8, wherein the swelling solution with which the dry swollen solid is obtained, contains organic molecules that are intercalated in order to produce a separation of sheets of the precursor.

13. A process according to claim 12, wherein the organic molecules used in the swelling solution with which the dry swollen solid is obtained are selected between molecules that have a proton acceptor group and a hydrocarbonaceous chain.

14. A process according to claim 12, or 13, wherein the organic molecules used in the swelling solution with which the dry swollen solid is obtained are selected from among alkylammonium molecules, with a number of carbon atoms between 4 and 24.

15. A process according to claim 12, wherein the organic molecules used in the swelling solution with which the dry swollen solid is obtained are molecules of cetyltrimetylammonium chloride ($CTMA^+$).

16. A process according to claim 15, wherein the dry swollen solid has X-ray diffraction values corresponding to

| d (Å) | (I/IO) *100 | d (Å) | (I/IO) *100 |
|---|---|---|---|
| 37.89 ± 0.02 | vs | 4.71 ± 0.03 | w |
| 14.50 ± 0.02 | s | 4.23 ± 0.04 | m |
| 12.50 ± 0.03 | m | 4.14 ± 0.08 | m |
| 11.73 ± 0.01 | w | 3.95 ± 0.09 | m |
| 10.01 ± 0.04 | w | 3.86 ± 0.08 | m |
| 7.66 ± 0.05 | w | 3.82 ± 0.09 | m |
| 7.36 ± 0.03 | w | 3.51 ± 0.08 | m |
| 6.99 ± 0.06 | w | 3.43 ± 0.08 | w |
| 6.55 ± 0.05 | w | 3.31 ± 0.05 | w |
| 5.98 ± 0.01 | w | 3.18 ± 0.07 | w |
| 5.59 ± 0.08 | w | 2.88 ± 0.09 | w |
| 5.11 ± 0.04 | w | | | wherein w is a weak relative intensity between 0 and 20%;

m is an average relative intensity between 20 & 40%;

s is an average relative intensity between 40 and 60%;

vs is an average relative intensity between 60 and 100%.

17. A process according to claim 8, wherein the swelling solution comprises a suspension of the precursor in a solid suspension between 10 and up to 50% by weight;

a cetyltrimethylammonium hydroxide solution ($OH^-$, $Br^-$) between 10 up to 50% by weight;

a tetrapropylammonium solution ($TPA^+$) ($OH^-$, $Br^-$) between 20 up to 60% by weight.

18. A process according to claim 8, wherein the swelling solution comprises a suspension of the solid precursor up to 20% by weight;

a cetyltrimetylammonium hydroxide solution ($OH^-$, $Br^-$) up to 29% by weight;

a tetrapropylammonium solution ($OH^-$, $Br^-$) up to 40% by weight;

with a weight ratio of precursor suspension:cetyltrimethylammonium hydroxide solution:tetrapropylammonium solution of 27:105:33.

19. A process according to claim 8, wherein the fourth step is carried out at least by means of a technique selected from the group consisting of mechanical stirring, ultrasound, spray-drying, lyophilization and combinations thereof.

20. A process according to claim 8, wherein the suspension that contains the at least partially delaminated material is subjected to flocculation.

21. A process according to claim 8, in wherein the sixth stage, the at least partially delaminated material is calcinated in an air flow, at a temperature between 300° C. and 800° C. for at least 3 hours.

22. A process according to claim 21, wherein the temperature is between 400° C. and 600° C.

* * * * *